United States Patent
Li et al.

(10) Patent No.: US 11,770,022 B2
(45) Date of Patent: Sep. 26, 2023

(54) NANOCRYSTALLINE MAGNETIC CONDUCTIVE SHEET FOR WIRELESS CHARGING AND PREPARATION METHOD THEREFOR

(71) Applicant: Shenzhen YN Tech Co., Ltd., Guangdong (CN)

(72) Inventors: Kevin Li, Guangdong (CN); James Wang, Guangdong (CN); Jeff Zhang, Guangdong (CN); Danny Ma, Guangdong (CN); Lavin Li, Guangdong (CN); Terrence Zeng, Guangdong (CN)

( * ) Notice: Subject to any disclaimer, the term of this patent is extended or adjusted under 35 U.S.C. 154(b) by 0 days.

(21) Appl. No.: 17/751,658

(22) Filed: May 23, 2022

(65) Prior Publication Data
US 2022/0393508 A1 Dec. 8, 2022

(30) Foreign Application Priority Data
May 25, 2021 (CN) .......................... 202110572813.8

(51) Int. Cl.
| | |
|---|---|
| *H01F 27/36* | (2006.01) |
| *H01F 1/153* | (2006.01) |
| *C22C 45/02* | (2006.01) |
| *H02J 50/10* | (2016.01) |
| *H02J 50/70* | (2016.01) |

(52) U.S. Cl.
CPC .............. *H02J 50/10* (2016.02); *C22C 45/02* (2013.01); *H01F 1/15308* (2013.01); *H01F 1/15333* (2013.01); *H01F 1/15341* (2013.01); *H01F 27/36* (2013.01); *H02J 50/70* (2016.02)

(58) Field of Classification Search
None
See application file for complete search history.

(56) References Cited

U.S. PATENT DOCUMENTS

2012/0262266 A1* 10/2012 Herzer ................ H01F 1/15333
977/773

FOREIGN PATENT DOCUMENTS

| | | |
|---|---|---|
| CN | 104011814 A | 8/2014 |
| CN | 104451071 A | 3/2015 |
| CN | 108430203 A | 8/2018 |
| CN | 109817442 A | 5/2019 |
| CN | 110284082 A | 9/2019 |

(Continued)

OTHER PUBLICATIONS

Machine translation of CN111057970. (Year: 2020).*

(Continued)

*Primary Examiner* — Xiaowei Su

(57) ABSTRACT

A nanocrystalline magnetic conductive sheet for wireless charging and a preparation method therefor are provided. The nanocrystalline magnetic conductive sheet includes a composition of $Fe_{(100-x-y-z-\alpha-\beta-\gamma)}M_xCu_yM'_zSi_\alpha B_\beta X_\gamma$, saturation magnetic induction is greater than or equal to 1.25T. The preparation method includes preparing an alloy with a preset composition of into an alloy strip with an initial state of amorphousness by a single roll rapid quenching method, annealing an amorphous alloy strip according to a preset annealing process, to obtain a nanocrystalline strip, performing a magnetic fragmentation process on the nanocrystalline strip, to obtain the nanocrystalline magnetic conductive sheet for wireless charging.

6 Claims, 1 Drawing Sheet

(56) References Cited

FOREIGN PATENT DOCUMENTS

| | | | |
|---|---|---|---|
| CN | 110453156 A | | 11/2019 |
| CN | 111057970 A | * | 4/2020 |
| CN | 112048602 A | | 12/2020 |

OTHER PUBLICATIONS

1st Office Action of counterpart Chinese Patent Application No. 202110572813.8 dated Feb. 7, 2022.
Notice of Allowance of counterpart Chinese Patent Application No. 202110572813.8 dated Apr. 28, 2022.

* cited by examiner

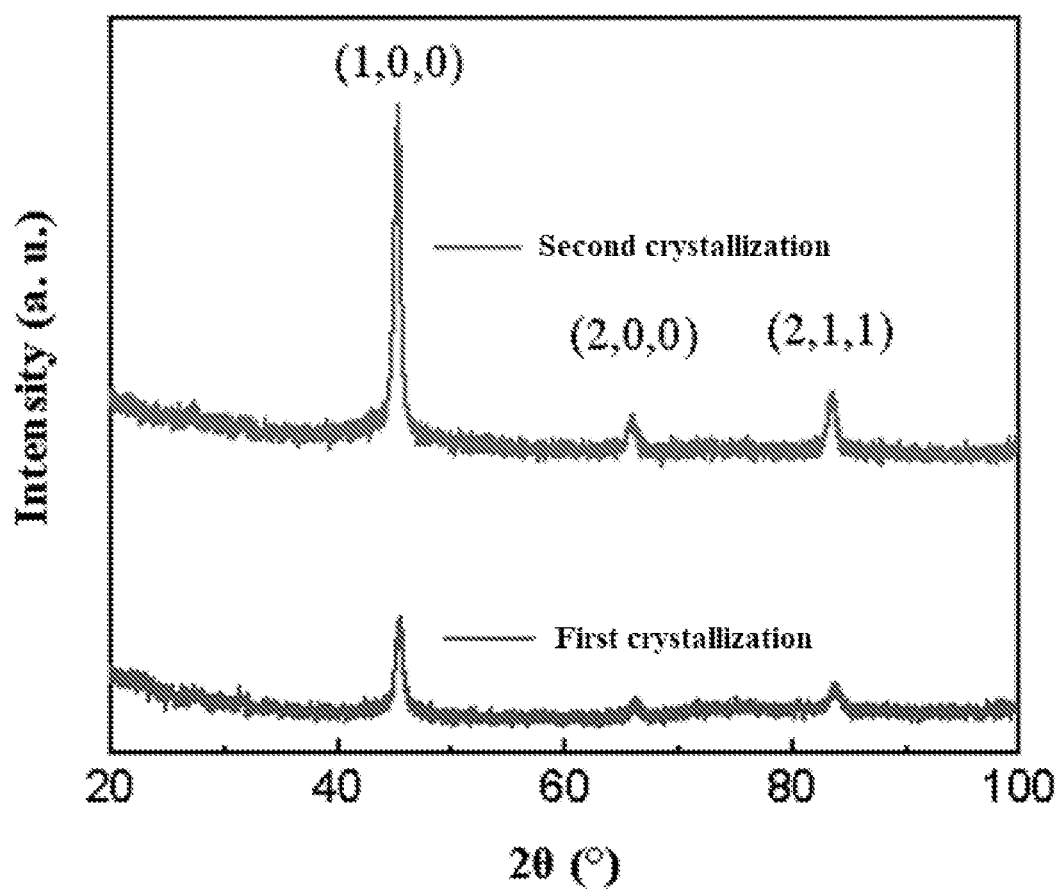

NANOCRYSTALLINE MAGNETIC CONDUCTIVE SHEET FOR WIRELESS CHARGING AND PREPARATION METHOD THEREFOR

CROSS REFERENCE TO RELATED APPLICATION

The present application claims the benefit of Chinese Patent Application No. 202110572813.8 filed on May 25, 2021, which is incorporated by reference herein in its entirety.

FIELD

The subject matter herein generally relates to wireless charging materials, and particularly to a nanocrystalline magnetic conductive sheet for wireless charging and a preparation method of the nanocrystalline magnetic conductive sheet.

BACKGROUND

With popularity of wireless power charging (WPC) in the field of consumer electronics, especially mobile phones, more and more mobile phones support such function. Magnetic shielding materials are required in a wireless charging receiving end of the mobile phone, due to the excellent soft magnetic and ultra-thin properties, the nanocrystalline magnetic conductive sheet has become a mainstream solution of the magnetic shielding materials for the wireless charging receiving end of the mobile phone.

In the existing processing methods of the nanocrystalline magnetic conductive sheets, typical nanocrystalline with a FINEMET® type are usually used as core magnetic conductive material. Due to the low saturation magnetic induction intensity of 1.24 T, after being processed into a magnetic conductive sheet for wireless charging, the nanocrystalline cannot achieve high-power wireless charging such as 30 W and above under limited overall thickness. The saturation magnetic induction intensity of the widely used nanocrystalline material is only 1.24 T depending on its composition, therefore, application requirements of high power cannot met. Although the increase in the thickness of the single-layer nanocrystalline strip can enhance its saturation current characteristic, it may cause increase of high frequency loss, and further increase the heat generation of the entire magnetic sheet, which may result in poor usability. At the same time, the increase in the thickness of the single-layer nanocrystalline strip may cause increase in the overall thickness of the entire magnetic sheet, which is inconsistent with the thin and light design requirement of customers.

As disclosed in a Chinese patent application with a publication number CN104011814A, a magnetic field shielding sheet for a wireless charger includes at least one single-layer thin magnetic sheet made of an amorphous ribbon separated into multiple fine strands; a protective film adhered onto one side of the thin magnetic sheet via a first adhesive layer; and double-sided tape adhered onto the other side of the thin magnetic sheet via a second adhesive layer formed on one side of the double-sided tape, the gap among the multiple fine strands is filled with portions of the first adhesive layer and second adhesive layer such that the multiple fine strands are isolated from each other.

However, this solution has the following disadvantages: 1. the protective film may affect appearance and performance, the protective film is required to be peeled off after a fragmentation process, which may take away the broken nanocrystal fragments, cause fall off of the nanocrystals, and further cause bump defects of the appearance and performance degradation, the reason for the performance degradation is that flatness of the nanocrystals is destroyed, which result in a decrease in magnetic permeability, at the same time, the fall off of the nanocrystal fragments may lead to a decrease in quality of the effective magnetic sheet, and further lead to performance degradation. 2. The thickness is too thick, according to the structure disclosed in the patent application, the adhesive layer is required to be filled into the gaps after the nanocrystals are fragmented to achieve insulation, so that the thickness of the adhesive layer is required to be thick, the thickness of the adhesive layer may be required to be more than 50% of the thickness of the nanocrystal, and preferably 10/20/30 um. However, in the application scenarios of the high-power magnetic isolation sheets, from a perspective of design, it is usually hoped to increase the thickness of functional materials of the nanocrystalline magnetic sheet, and reduce the thickness of non-functional materials such as the adhesive layers. Apparently, the thickness of the adhesive layer as disclosed in the patent application cannot meet the application requirements of high-power magnetic isolation sheets. 3. The magnetic field shielding sheet cannot support high power, as disclosed in the patent application, the gaps in the nanocrystal are required to be filled with the adhesive layer for insulation, in order to achieve this, the gaps in the nanocrystal are relatively large, so that the adhesive layer can be filled and achieve insulation, however, the large gap means that the magnetic permeability of the nanocrystal decreases significantly, and the decrease in the magnetic permeability may cause the decrease of the anti-saturation performance of the magnetic sheet, thus, the high-power wireless charging may not be realized.

SUMMARY

In view of above, a purpose of the present disclosure is to provide a nanocrystalline magnetic conductive sheet for wireless charging.

Another purpose of the present disclosure is to provide a preparation method of a nanocrystalline magnetic conductive sheet for wireless charging.

A nanocrystalline magnetic conductive sheet for wireless charging, including:

a composition of $Fe_{(100-y-z-\alpha-\beta)}Cu_yNb_zSi_\alpha B_\beta$, $0.7 \le y \le 1$, $1.3 \le z \le 2$, $4 \le \alpha \le 14$, $7 \le \beta \le 10$, $y+z+\alpha+\beta+\gamma \le 26$, and saturation magnetic induction $B_s$ of the nanocrystalline magnetic conductive sheet ranges from 1.35 to 1.60 T;

the nanocrystalline magnetic conductive sheet is prepared by:

preparing an alloy with a composition of $Fe(100-y-z-\alpha-\beta)CuyNbzSi\alpha B\beta$ into an alloy strip with an initial state of amorphousness by a single roll rapid quenching method;

annealing an amorphous alloy strip according to a preset annealing process, to obtain a single-layer nanocrystalline strip; and superimposing or not superimposing multiple single-layer nanocrystalline strips, performing a magnetic fragmentation process on the single-layer nanocrystalline strip or a multi-layer nanocrystalline strip, and compositing or not compositing multiple single-layer nanocrystalline strips or multiple multi-layer nanocrystalline strips that are completed the magnetic fragmentation process, to obtain the nanocrystalline magnetic conductive sheet for wireless charging;

the preset annealing process is a twice annealing process, the twice annealing process comprises:

raising temperature to T1 at a rate of 1 to 5° C. per minute, maintaining the temperature at T1 for 10 to 60 min, raising the temperature to T2 at a rate of 0.5 to 3° C. per minute, maintaining the temperature at T2 for 30 to 240 min, reduce the temperature to below 200° C., raising the temperature to T3 at the rate of 1 to 5° C. per minute, maintaining the temperature at T3 for 10 to 60 min, raising the temperature to T4 at the rate of 0.5 to 3° C. per minute, maintaining the temperature at T4 for 20 to 240 min, reducing the temperature to below 200° C., and taking materials out of a furnace, T1 and T3 are 0 to 50° C. below a crystallization onset temperature of the alloy strip, T2 and T4 are above a crystallization peak temperature of the alloy strip, T3 is 5 to 50° C. higher than T1, and T4 is 0 to 50° C. higher than T2.

A preparation method of nanocrystalline magnetic conductive sheet for wireless charging, including:

preparing an alloy with a composition of $Fe_{(100-y-z-\alpha-\beta)}Cu_yNb_zSi_\alpha B_\beta$ into an alloy strip with an initial state of amorphousness by a single roll rapid quenching method, $0.7 \leq y \leq 1$, $1.3 \leq z \leq 2$, $4 \leq \alpha \leq 14$, $7 \leq \beta \leq 10$, $y+z+\alpha+\beta+\gamma \leq 26$;

annealing an amorphous alloy strip according to a preset annealing process, to obtain a single-layer nanocrystalline strip, saturation magnetic induction $B_s$ of the single-layer nanocrystalline strip is greater than 1.24 T; and superimposing or not superimposing multiple single-layer nanocrystalline strips, performing a magnetic fragmentation process on the single-layer nanocrystalline strip or a multi-layer nanocrystalline strip, and compositing or not compositing multiple single-layer nanocrystalline strips or multiple multi-layer nanocrystalline strips that are completed the magnetic fragmentation process, to obtain the nanocrystalline magnetic conductive sheet for wireless charging;

the preset annealing process is a twice annealing process, the twice annealing process comprises:

raising temperature to T1 at a rate of 1 to 5° C. per minute, maintaining the temperature at T1 for 10 to 60 min, raising the temperature to T2 at a rate of 0.5 to 3° C. per minute, maintaining the temperature at T2 for 30 to 240 min, reduce the temperature to below 200° C., raising the temperature to T3 at the rate of 1 to 5° C. per minute, maintaining the temperature at T3 for 10 to 60 min, raising the temperature to T4 at the rate of 0.5 to 3° C. per minute, maintaining the temperature at T4 for 20 to 240 min, reducing the temperature to below 200° C., and taking materials out of a furnace, T1 and T3 are 0 to 50° C. below a crystallization onset temperature of the alloy strip, T2 and T4 are above a crystallization peak temperature of the alloy strip, T3 is 5 to 50° C. higher than T1, and T4 is 0 to 50° C. higher than T2.

The preparation method and the obtained product of the present disclosure have the following advantages and beneficial effects:

(1) The present disclosure has made an inventive development on the annealing process of the amorphous alloy strip, thereby realizing increase of an applicable charging power range of the magnetic sheet, and the overall magnetic loss is controlled at an equivalent level to that of the typical nanocrystalline. The finally obtained magnetic conductive sheet for wireless charging can increase the charging power by more than 30% under a premise of same overall thickness.

(2) The present disclosure has redesigned the structure of the magnetic conductive sheet, by means of the unique annealing process, the fragmentation process, and the compositing process, the design of filling insulation with an adhesive layer is canceled, at the same time, the gaps between the magnetic sheets of the nanocrystalline are extremely small, the applied double-sided adhesive is also extremely thin, and insulation is achieved without filling the double-sided adhesive into the nanocrystalline gap. Further, the anti-saturation performance of the magnetic sheet is greatly improved, the thickness is effectively controlled, and the related loss is still maintained at a lower level. Since insulation is achieved without filling the double-sided adhesive into the nanocrystalline gap, the double-sided adhesive with the thickness of 1 to 5 um can be used for adhesion between the layers, thereby greatly reduce the overall product thickness. In the case of the same thickness design, the effective thickness of the nanocrystalline functional material itself can be increased, thereby increasing the supportable charging power, and further implementing the magnetic sheet design for high-power.

(3) The structure of existing nanocrystalline magnetic conductive sheet is that, a single layer nanocrystalline strip is covered on one side with the double-sided adhesive, and is processed by magnetic fragmentation treatment, such structure may cause one side of the nanocrystalline strip to be exposed and unprotected during processing, since the magnetic fragmentation process may cause the nanocrystalline strip to fragment into a tiny fragment state, for example, if one side of the nano-crystalline strip is in a bare and unprotected state, the fragments generated during the magnetic fragmentation process may peel or bulge, a foreign body bulge on the surface may further formed in the subsequent multilayer compositing process, thereby causing poor appearance or performance of the nanocrystalline magnetic sheet. The present disclosure applies a protective structure of double-sided adhesive coating for the nanocrystalline strip, both sides are protected by the adhesive film, in the subsequent process of magnetic fragmentation treatment, the crack lines are formed on the surface of the nanocrystal strip and both sides are protected and fixed by the adhesive film, on the one hand, tiny fragments are not easy to be displaced, which is beneficial to generate uniform crack lines, and on the other hand, peeling and bulge are not easy to be formed, thereby preventing poor appearance or performance. Subsequently, multiple layers of the nanocrystalline sheet are adhered and composited, in the adhesive process, both sides of the nanocrystalline sheet are protected by the adhesive film, which further reduces a probability of fragment peeling and bulge, and greatly ensures an appearance yield and an performance yield of the nanocrystalline magnetic conductive sheet after multilayer compositing.

BRIEF DESCRIPTION OF THE DRAWINGS

In order to clearly explain technical solutions of embodiments of the present disclosure or in the related art, drawings used in the description of the embodiments or the related art are briefly described below. Obviously, the drawings as described below are merely some embodiments of the present disclosure. Based on these drawings, other drawings can be obtained by those skilled in the art without paying creative efforts.

The sole FIGURE is a X-Ray Diffraction (XRD) pattern of a nanocrystalline strip after a first crystallization process and a second crystallization process of an embodiment 4.

DETAILED DESCRIPTION

Multiple embodiments are described in the present disclosure, but the description is exemplary rather than limiting, and there may be more embodiments and implementation solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

When describing representative embodiments, the specification may have presented methods and/or processes as a specific sequence of steps. However, to the extent that the method or process does not depend on the specific order of steps described in the present disclosure, the method or process should not be limited to the specific order of steps described. As understood by those of ordinary skills in the art, other orders of steps are also possible. Therefore, the specific order of steps set forth in the specification should not be interpreted as limitation to the claims. In addition, the claims for the method and/or process should not be limited to the steps performed in the written order, and those of skilled in the art may readily understand that these orders may vary and still remain within the essence and scope of the embodiments of the present disclosure.

Unless otherwise defined, technical terms or scientific terms used in the embodiments shall have common meanings as construed by those of ordinary skills in the art to which the present disclosure pertains. The words "first", "second" and the like used in the embodiments of the present disclosure do not represent any order, quantity or importance, but are merely used to distinguish among different components. The words "include", "contain" or the like mean that elements or articles appearing before the words cover elements or articles listed after the words and their equivalents, without excluding other elements or articles. The words "connect", "link" or the like are not limited to physical or mechanical connection, but may include electrical connection, whether direct or indirect.

A nanocrystalline magnetic conductive sheet for wireless charging, includes a composition of $Fe_{(100-x-y-z-\alpha-\beta-\gamma)}M_xCu_yM'_zSi_\alpha B_\beta X_\gamma$, M is Co and/or Ni, M' is at least one element of Nb, V, Mo, Ta, W, Zr, Hf, Ti, Cr, Mn, Al, Sc, Y, Zn, Sn, X is at least one element of C, Ge, P, Ga, Sb, In, S, $0 \leq x \leq 40$, $0.5 \leq y \leq 1.5$, $1 \leq z \leq 5$, $1 \leq \alpha \leq 18$, $5 \leq \beta \leq 15$, $0 \leq \gamma \leq 3$, and $x+y+z+\alpha+\beta+\gamma \leq 26$;

saturation magnetic induction $B_s$ of the nanocrystalline magnetic conductive sheet is greater than or equal to 1.25 T;

the nanocrystalline magnetic conductive sheet is prepared by:

preparing an alloy with a composition of $Fe_{(100-x-y-z-\alpha-\beta-\gamma)}M_xCu_yM'_zSi_\alpha B_\beta X_\gamma$ into an alloy strip with an initial state of amorphousness by a single roll rapid quenching method;

annealing an amorphous alloy strip according to a preset annealing process, to obtain a single-layer nanocrystalline strip; and superimposing or not superimposing multiple single-layer nanocrystalline strips, performing a magnetic fragmentation process on the single-layer nanocrystalline strip or multi-layer nanocrystalline strip, and compositing or not compositing multiple single-layer nanocrystalline strips or multiple multi-layer nanocrystalline strips that are completed the magnetic fragmentation process, to obtain the nanocrystalline magnetic conductive sheet for wireless charging.

the preset annealing process is a once annealing process or a twice annealing process;

the once annealing process includes: raising temperature to T1 at a rate of 1 to 5° C. per minute, maintaining the temperature at T1 for 10 to 60 min, raising the temperature to T2 at a rate of 0.5 to 3° C. per minute, maintaining the temperature at T2 for 30 to 240 min, reducing the temperature to below 200° C., and taking materials out of a furnace, T1 is 0 to 50° C. below a crystallization onset temperature of the alloy strip, T2 is above a crystallization peak temperature of the alloy strip.

The twice annealing process includes: raising a temperature to T1 at a rate of 1 to 5° C. per minute, maintaining the temperature at T1 for 10 to 60 min, raising the temperature to T2 at a rate of 0.5 to 3° C. per minute, maintaining the temperature at T2 for 30 to 240 min, reduce the temperature to below 200° C., further raising the temperature to T3 at the rate of 1 to 5° C. per minute, maintaining the temperature at T3 for 10 to 60 min, raising the temperature to T4 at the rate of 0.5 to 3° C. per minute, maintaining the temperature at T4 for 20 to 240 min, reducing the temperature to below 200° C., and taking materials out of a furnace, T1 and T3 are 0 to 50° C. below a crystallization onset temperature of the alloy strip, T2 and T4 are above a crystallization peak temperature of the alloy strip, T3 is 5 to 50° C. higher than T1, and T4 is 0 to 50° C. higher than T2.

In one embodiment, the nanocrystalline magnetic conductive sheet for wireless charging includes a composition of $Fe_{(100-y-z-\alpha-\beta)}Cu_yNb_zSi_\alpha B_\beta$, $0.7 \leq y \leq 1$, $1.3 \leq z \leq 2.9$, $4 \leq \alpha \leq 15.1$, $7 \leq \beta \leq 10$, saturation magnetic induction $B_s$ of the nanocrystalline magnetic conductive sheet ranges from 1.25 to 1.60 T.

A preparation method of nanocrystalline magnetic conductive sheet for wireless charging includes:

preparing an alloy with a composition of $Fe_{(100-x-y-z-\alpha-\beta-\gamma)}M_xCu_yM'_zSi_\alpha B_\beta X_\gamma$ into an alloy strip with an initial state of amorphousness by a single roll rapid quenching method, M is Co and/or Ni, M' is at least one element of Nb, V, Mo, Ta, W, Zr, Hf, Ti, Cr, Mn, Al, Sc, Y, Zn, Sn, X is at least one element of C, Ge, P, Ga, Sb, In, S, $0 \leq x \leq 40$, $0.5 \leq y \leq 1.5$, $1 \leq z \leq 5$, $1 \leq \alpha \leq 18$, $5 \leq \beta \leq 15$, $0 \leq \gamma \leq 3$, and $x+y+z+\alpha+\beta+\gamma \leq 26$;

annealing an amorphous alloy strip according to a preset annealing process, to obtain a single-layer nanocrystalline strip, saturation magnetic induction $B_s$ of the single-layer nanocrystalline strip is greater than 1.24 T; and superimposing or not superimposing multiple single-layer nanocrystalline strips, performing a magnetic fragmentation process on the single-layer nanocrystalline strip or a multi-layer nanocrystalline strip, and compositing or not compositing multiple single-layer nanocrystalline strips or multiple multi-layer nanocrystalline strips that are completed the magnetic fragmentation process, to obtain the nanocrystalline magnetic conductive sheet for wireless charging;

the preset annealing process is a once annealing process or a twice annealing process.

The once annealing process includes: raising a temperature to T1 at a rate of 1 to 5° C. per minute, maintaining the temperature at T1 for 10 to 60 min, raising the temperature to T2 at a rate of 0.5 to 3° C. per minute, maintaining the temperature at T2 for 30 to 240 min, reducing the temperature to below 200° C., and taking materials out of a furnace, T1 is 0 to 50° C. below a crystallization onset temperature of the alloy strip, T2 is above a crystallization peak temperature of the alloy strip.

The twice annealing process includes: raising a temperature to T1 at a rate of 1 to 5° C. per minute, maintaining the temperature at T1 for 10 to 60 min, raising the temperature to T2 at a rate of 0.5 to 3° C. per minute, maintaining the temperature at T2 for 30 to 240 min, reduce the temperature to below 200° C., raising the temperature to T3 at the rate of 1 to 5° C. per minute, maintaining the temperature at T3 for 10 to 60 min, raising the temperature to T4 at the rate of 0.5 to 3° C. per minute, maintaining the temperature at T4 for 20 to 240 min, reducing the temperature to below 200° C., and taking materials out of a furnace, T1 and T3 are 0 to 50° C. below a crystallization onset temperature of the alloy strip, T2 and T4 are above a crystallization peak temperature of the alloy strip, T3 is 5 to 50° C. higher than T1, and T4 is 0 to 50° C. higher than T2.

In one embodiment, a width range of the amorphous alloy strip is 10 to 215 mm, a thickness range of the amorphous alloy strip is 10 to 30 μm.

In one embodiment, before the magnetic fragmentation process is performed, an outermost layer of the single-layer nanocrystalline strip or the multi-layer nanocrystalline strip is protected by a double-sided adhesive coating process, one side of the outermost layer is coated with double-sided adhesive, and the other side of the outermost layer is coated with the double-sided adhesive or single-sided adhesive. When the nanocrystalline strip is protected by double-sided adhesive coating, in the subsequent magnetic fragmentation process, crack lines are formed on a surface of the nanocrystal strip and both sides are protected and fixed by an adhesive film, on the one hand, tiny fragments are not easy to be displaced, which is beneficial to generate uniform crack lines, and on the other hand, peeling and bulge are not easy to be formed, thereby preventing poor appearance or performance. Subsequently, multiple layers of nanocrystalline sheets after the magnetic fragmentation process are adhered and composited, in the adhering process, both sides of the nanocrystalline sheet are protected by the adhesive film, which further reduces a probability of peeling fragment and forming bulge, and greatly ensures an appearance yield and an performance yield of the nanocrystalline magnetic conductive sheet after multilayer compositing.

In one embodiment, a number of layers of multi-layer superimposing is 2 to 4, and adjacent two layers of nanocrystalline strips are fixed by double-sided adhesive. By superimposing a suitable number of layers, a fine magnetic fragmentation structure can be ensured, at the same time, the number of layers of protective double-sided adhesive coating can be saved, thereby reduce the overall thickness of the nanocrystalline magnetic conductive sheet.

In one embodiment, a thickness range of the double-sided adhesive or the single-sided adhesive is 1 to 5 μm.

In one embodiment, the magnetic fragmentation process includes transverse or longitudinal roller shearing, or laminating by a roller or a flat with convex points, or other method that makes uniform crack lines appear on a surface of the nanocrystalline strip. In order to avoid large gaps are formed after the nanocrystalline is cracked, and avoid causing significant reduction of the magnetic permeability and anti-saturation characteristics, the crack lines are required to be tiny and delicate, a fragmentation process of tiny crack lines, little pressure, and multiple rolling are applied.

An inventive principle of the present disclosure is to redesign and optimize the composition of nanocrystalline, and the composition of nanocrystalline is designed to be $Fe_{(100-x-y-z-\alpha-\beta-\gamma)}M_xCu_yM'_zSi_\alpha B_\beta X_\gamma$, M is Co and/or Ni, M' is at least one element of Nb, V, Mo, Ta, W, Zr, Hf, Ti, Cr, Mn, Al, Sc, Y, Zn, Sn, X is at least one element of C, Ge, P, Ga, Sb, In, S, $0 \le x \le 40$, $0.5 \le y \le 1.5$, $1 \le z \le 5$, $1 \le \alpha \le 18$, $5 \le \beta \le 15$, $0 \le \gamma \le 3$, and $x+y+z+\alpha+\beta+\gamma \le 26$.

After being optimized, saturation magnetic induction $B_s$ of the series of alloys is greater than or equal to 1.25 T, and an optimized range of the saturation magnetic induction $B_s$ is 1.25 to 1.60 T.

Further, in combination with a unique annealing process, a fragmentation process, and compositing process provided in the present disclosure, a high frequency alternating-current loss value of the nanocrystalline magnetic conductive sheet is comparable to that of the typical FINEMET® nanocrystalline material, and this is an unachieved result of any existing material or technology.

In order to increase the saturation magnetic induction of a material, content of ferromagnetic elements in the material is required to be increased, that is, the content of other non-ferromagnetic elements is required to be decreased, in order to ensure that the material has a better amorphous forming capacity and a better control of a crystallization process, the content of each non-ferromagnetic element is required to be adjusted downwards at the same time. The decrease of the content of Nb may lead to a decrease in controllability of the crystallization process of the material, so that the crystallization exothermic process is more vigorous, and the crystal grain easily becomes thick and big, thereby worsening the soft magnetic characteristic of the material. In view of this, the unique annealing process provided in the present disclosure is based on the characteristic of the material, delays the heating process, so that the crystallization exothermic process is less vigorous, and the loss of the annealed material slightly increases or even does not significantly increase compared with that of the typical FINEMET® alloy.

In detail, in the annealing process, the material is preprocessed at a relatively low temperature (e.g. 0 to 50° C. below the crystallization onset temperature), after the material forms parts of grains with a relatively small size, the material undergoes a crystallization process by raising the temperature to above the crystallization peak temperature at a relatively low rate (e.g. 0.5 to 3° C. per minute), the material further undergoes a second crystallization process, since the material has formed parts of crystal grains on the amorphous matrix, and the content of Nb in the remaining amorphous phase is relatively high, so that the controllability of the second crystallization process is very high, the high frequency loss of the annealed material is comparable to or slightly higher than that of the typical FINEMET® alloy.

In addition, the magnetic fragmentation process is performed on the nanocrystalline strip after being protected by double-sided adhesive coating, the gaps of the nanocrystalline strip after the magnetic fragmentation process in the present disclosure are not required to be filled with the adhesive layer, when crack lines are formed on the surface of the nanocrystal strip and both sides are protected and fixed by the adhesive film, on the one hand, tiny fragments are not easy to be displaced, which is beneficial to generate uniform crack lines, and on the other hand, peeling and bulge are not easy to be formed, thereby preventing poor appearance or performance.

Embodiment 1

(1) Prepare an alloy with a composition of $Fe_{bal.}Cu_1Nb_{2.9}Si_{15.1}B_7$ (at. %) into an alloy strip with an initial state of amorphousness by a single roll rapid quenching method, thickness of the alloy strip is 20 μm, after a test, a crystallization onset temperature of the alloy strip is 510° C., and a crystallization peak temperature of the alloy strip is 531° C.

(2) Anneal the amorphous alloy strip according to the following heat treatment process: put materials in a furnace, raise temperature to 475° C. at a rate of 4° C. per minute, maintain the temperature for 60 minutes, raise the temperature to 565° C. at a rate of 3° C. per minute, maintain the temperature for 120 minutes, reduce the temperature to below 200° C., and take the materials out of the furnace. The saturation magnetic induction $B_s$ of the annealed nanocrystalline strip is 1.25 T. The above-mentioned temperature may be temperature of the furnace.

(3) Superimpose two single-layer nanocrystalline strips that are completed annealing, the two single-layer nanocrystalline strips are fixed by double-sided adhesive, and an outermost layer of the single-layer nanocrystalline strip is protected by a double-sided adhesive coating process, one side of the outermost layer is coated with the double-sided adhesive, and the other side is coated with single-sided adhesive, thickness of the double-sided adhesive and the single-sided adhesive are both 3 μm. Perform a magnetic fragmentation process on the double-layer nanocrystalline strip coated with the double-sided adhesive, composite two double-layer nanocrystalline strips that are completed the magnetic fragmentation process, thus, a four-layer nanocrystalline magnetic conductive sheet for high-power wireless charging is formed.

Embodiment 2

(1) Prepare an alloy with a composition of $Fe_{bal.}Cu_1Nb_2Si_{14}B_{7.5}$ (at. %) into an alloy strip with an initial state of amorphousness by a single roll rapid quenching method, thickness of the alloy strip is 20 μm, after a test, a crystallization onset temperature of the alloy strip is 490° C., and a crystallization peak temperature of the alloy strip is 508° C.

(2) Anneal the amorphous alloy strip according to the following heat treatment process: put materials in a furnace, raise temperature to 460° C. at a rate of 3° C. per minute, maintain the temperature for 60 minutes (pre-process), raise the temperature to 560° C. at a rate of 2° C. per minute, maintain the temperature for 120 minutes (crystallization process), reduce the temperature to below 200° C., and take the materials out of the furnace. The saturation magnetic induction $B_s$ of the annealed nanocrystalline strip is 1.35 T.

(3) Protect the single-layer nanocrystalline strip that is completed annealing by a double-sided adhesive coating process, two sides are both coated with the double-sided adhesive, thickness of the double-sided adhesive is 3 μm. Perform a magnetic fragmentation process on the single-layer nanocrystalline strip coated with the double-sided adhesive, composite four single-layer nanocrystalline strips that are completed the magnetic fragmentation process, thus, a four-layer nanocrystalline magnetic conductive sheet for high-power wireless charging is formed.

Embodiment 3

(1) Prepare an alloy with a composition of $Fe_{bal.}Cu_{0.9}Nb_{1.8}Si_{12}B_7$ (at. %) into an alloy strip with an initial state of amorphousness by a single roll rapid quenching method, thickness of the alloy strip is 20 μm, after a test, a crystallization onset temperature of the alloy strip is 470° C., and a crystallization peak temperature of the alloy strip is 485° C.

(2) Anneal the amorphous alloy strip according to the following heat treatment process: put materials in a furnace, raise temperature to 445° C. at a rate of 3° C. per minute, maintain the temperature for 60 minutes, and raise the temperature to 555° C. at a rate of 2° C. per minute, maintain the temperature for 120 minutes, reduce the temperature to below 200° C., and take the materials out of the furnace. The saturation magnetic induction $B_s$ of the annealed nanocrystalline strip is 1.45 T.

(3) Superimpose two single-layer nanocrystalline strips that are completed annealing, the two single-layer nanocrystalline strips are fixed by double-sided adhesive, and an outermost layer of the single-layer nanocrystalline strip is protected by a double-sided adhesive coating process, one side of the outermost layer is coated with the double-sided adhesive, and the other side is coated with single-sided adhesive, thickness of the double-sided adhesive and the single-sided adhesive are both 3 μm. Perform a magnetic fragmentation process on the double-layer nanocrystalline strip coated with the double-sided adhesive, composite two double-layer nanocrystalline strips that are completed the magnetic fragmentation process, thus, a four-layer nanocrystalline magnetic conductive sheet for high-power wireless charging is formed.

Embodiment 4

(1) Prepare an alloy with a composition of $Fe_{bal.}Cu_{0.8}Nb_{1.4}Si_6B_{10}$ (at. %) into an alloy strip with an initial state of amorphousness by a single roll rapid quenching method, a thickness of the alloy strip is 20 μm, after a test, a crystallization onset temperature of the alloy strip is 445° C., and a crystallization peak temperature of the alloy strip is 462° C.

(2) Anneal the amorphous alloy strip according to the following heat treatment process: put materials in a furnace, raise temperature to 430° C. (T1) at a rate of 3° C. per minute, maintain the temperature for 30 minutes, raise the temperature to 505° C. (T2) at a rate of 2° C. per minute, maintain the temperature for 90 minutes, reduce the temperature to below 200° C., and take the material out of the furnace, at this time, first crystallization annealing is completed, put the material into the furnace again, raise the temperature to 440° C. (T3) at a rate of 3° C. per minute, maintain the temperature for 30 minutes, raise the temperature to 550° C. (T4) at a rate of 2° C. per minute, maintain the temperature for 30 minutes, reduce the temperature to below 200° C., and take the material of the furnace, at this time, second crystallization annealing is completed. The saturation magnetic induction $B_s$ of the annealed nanocrystalline strip is 1.55 T.

The sole FIGURE illustrates X-Ray Diffraction (XRD) maps of the nanocrystalline strips obtained after a first crystallization process and a second crystallization process of the embodiment, and Table 1 illustrates grain sizes and volume fractions of crystallized phase of nanocrystalline materials in two states. According to a result of XRD map analysis, a small amount of crystallized phases grows on the initial amorphous matrix after the first crystallization process, the grain size is approximately 13.1 nm, and the volume fraction of the crystallized phase is 28%, after the second crystallization process, the crystallization process is relatively sufficient, the grain size grows slightly to 15.0 nm, and the volume fraction of the crystallized phase reaches 76%. The above data show that, the method of twice crystallization annealing processes is effective, and the crystallization process is effectively controlled.

TABLE 1 crystallization state parameters of nanocrystalline material after a first crystallization process and a second crystallization process

| Sample | Grain size(nm) | Volume fraction of crystallized phase(%) |
|---|---|---|
| First crystallization process | 13.1 | 28 |
| Second crystallization process | 15.0 | 76 |

(3) Protect the single-layer nanocrystalline strip that is completed annealing by a double-sided adhesive coating process, two sides are both coated with the double-sided adhesive, thickness of the double-sided adhesive is 3 μm. Perform a magnetic fragmentation process on the single-layer nanocrystalline strip coated with the double-sided adhesive, composite four single-layer nanocrystalline strips that are completed the magnetic fragmentation process, thus, a four-layer nanocrystalline magnetic conductive sheet for high-power wireless charging is formed.

Embodiment 5

(1) Prepare an alloy with a composition of $Fe_{bal.}Cu_{0.7}Nb_{1.3}Si_4B_{10}$ (at. %) into an alloy strip with an initial state of amorphousness by a single roll rapid quenching method, thickness of the alloy strip is 20 μm, after a test, a crystallization onset temperature of the alloy strip is 440° C., and a crystallization peak temperature of the alloy strip is 453° C.

(2) Anneal the amorphous alloy strip according to the following heat treatment process: put materials in a furnace, raise the temperature to 430° C. (T1) at a rate of 3° C. per minute, maintain the temperature for 30 minutes, raise the temperature to 500° C. (T2) at a rate of 2° C. per minute, maintain the temperature for 90 minutes, reduce the temperature to below 200° C., and take the materials out of the furnace, at this time, first crystallization annealing is completed, put the materials into the furnace again, raise the temperature to 435° C. (T3) at a rate of 3° C. per minute, maintain the temperature for 60 minutes, raise the temperature to 550° C. (T4) at a rate of 2° C. per minute, maintain the temperature for 30 minutes, reduce the temperature to below 200° C., and take the materials out of the furnace, at this time, second crystallization annealing is completed. The saturation magnetic induction $B_s$ of the annealed nanocrystalline strip is 1.60 T.

(3) Superimpose two single-layer nanocrystalline strips that are completed annealing, the two single-layer nanocrystalline strips are fixed by double-sided adhesive, and an outermost layer of the single-layer nanocrystalline strip is protected by a double-sided adhesive coating process, one side of the outermost layer is coated with the double-sided adhesive, and the other side is coated with single-sided adhesive, thickness of the double-sided adhesive and the single-sided adhesive are both 3 μm. Perform a magnetic fragmentation process on the double-layer nanocrystalline strip coated with the double-sided adhesive, composite two double-layer nanocrystalline strips that are completed the magnetic fragmentation process, thus, a four-layer nanocrystalline magnetic conductive sheet for high-power wireless charging is formed.

Comparison Embodiment 1

(1) Prepare an alloy with a composition of $Fe_{bal.}Cu_1Nb_2Si_{14}B_{7.5}$ (at. %) into an alloy strip with an initial state of amorphousness by a single roll rapid quenching method, thickness of the alloy strip is 20 μm.

(2) Anneal the amorphous alloy strip according to the following heat treatment process: put materials in a furnace, raise the temperature to 560° C. at a rate of 10° C. per minute, maintain the temperature for 120 minutes, reduce the temperature to below 200° C., and take the materials out of the furnace. The saturation magnetic induction $B_s$ of the annealed nanocrystalline strip is 1.35 T.

(3) Protect the single-layer nanocrystalline strip that is completed annealing by a double-sided adhesive coating process, two sides are both coated with the double-sided adhesive, thickness of the double-sided adhesive is 3 μm. Perform a magnetic fragmentation process on the single-layer nanocrystalline strip coated with the double-sided adhesive, composite four single-layer nanocrystalline strips that are completed the magnetic fragmentation process, thus, a four-layer nanocrystalline magnetic conductive sheet for high-power wireless charging is formed.

Comparison Embodiment 2

(1) Prepare an alloy with a composition of $Fe_{bal.}Cu_1Nb_3Si_{15.5}B_7$ (at. %) into an alloy strip with an initial state of amorphousness by a single roll rapid quenching method, thickness of the alloy strip is 20 μm.

(2) Anneal the amorphous alloy strip according to the following heat treatment process: put materials in a furnace, raise the temperature to 560° C. at a rate of 10° C. per minute, maintain the temperature for 60 minutes, reduce the temperature to below 200° C., and take the materials out of the furnace. The saturation magnetic induction $B_s$ of the annealed nanocrystalline strip is 1.24 T.

(3) Protect the single-layer nanocrystalline strip that is completed annealing by a double-sided adhesive coating process, two sides are both coated with the double-sided adhesive, thickness of the double-sided adhesive is 3 μm. Perform a magnetic fragmentation process on the single-layer nanocrystalline strip coated with the double-sided adhesive, composite four single-layer nanocrystalline strips that are completed the magnetic fragmentation process, thus, a four-layer nanocrystalline magnetic conductive sheet for high-power wireless charging is formed.

Table 2 illustrates a performance comparison of the nanocrystalline magnetic conductive sheet prepared in the embodiments 1-5 and the comparison embodiments 1-2, the performance includes saturation magnetic induction $B_s$, magnetic permeability μ', inductance L, quality factor, and saturation current characteristic I. It can be seen from Table 2 that, the magnetic permeability (i.e. from 1398 to 1425) of magnetic sheets in the embodiments 1-5 and the comparison embodiments 1-2 are controlled at a same level, and the coil inductance also changes in a relatively small range (i.e. from 7.10 to 7.15). In comparison, as the saturation magnetic induction of the magnetic sheet increases, the quality factor (hereinafter Q value) corresponding to the magnetic sheet decreases, for example, the Q value of the magnetic sheet corresponding to $B_s=1.24$ T is 78, and when $B_s=1.60$ T, a corresponding Q value of the magnetic sheet is 72, the Q value decreases by 7.69%, which indicates that with the increase of the saturation magnetic induction, the loss of the magnetic sheet itself may increase, meanwhile, the saturation current corresponding to the magnetic sheet increases from 4.3 A to 6.3 A, a rate of the increase reaches 46.5%, that is, the increase of saturation magnetic induction of the nanocrystalline material has a significant effect on the increase of saturation current of the magnetic sheet, and the increase of the saturation current means improvement of anti-saturation characteristics of a corresponding wireless charging module, so that the wireless charging module may applied to a wireless charging scenario with a larger current and a larger power.

TABLE 2 performance comparison of nanocrystalline magnetic conductive sheets in the embodiments 1-5 and the comparison embodiments 1-2

| Ser. No. | $B_s$ | µ' | L(µH) | Quality factor | I |
|---|---|---|---|---|---|
| Embodiment 1 | 1.25 T | 1418 | 7.15 | 78 | 4.5 A |
| Embodiment 2 | 1.35 T | 1425 | 7.15 | 75 | 5.0 A |
| Embodiment 3 | 1.45 T | 1408 | 7.13 | 74 | 5.5 A |
| Embodiment 4 | 1.55 T | 1398 | 7.10 | 73 | 6.0 A |
| Embodiment 5 | 1.60 T | 1410 | 7.11 | 72 | 6.3 A |
| Comparison embodiment 1 | 1.35 T | 1412 | 7.12 | 72 | 4.5 A |
| Comparison embodiment 2 | 1.24 T | 1409 | 7.12 | 78 | 4.3 A |

Table 3 illustrates a comparison of wireless charging efficiencies of the nanocrystalline magnetic conductive sheets prepared in the embodiments 1-5 and the comparison embodiments 1-2 under different charging power, it can be seen efficiency differences under the different charging power by the comparison. In the embodiments 1-5, when the wireless charging power is 15 W, with the increase of the saturation magnetic induction $B_s$, the wireless charging efficiency tends to decrease; when the wireless charging power is 60 W, with the increase of the saturation magnetic induction $B_s$, on the contrary, the wireless charging efficiency tends to increase. Therefore, when the wireless charging power is 15 W, the wireless charging efficiency of the nanocrystalline magnetic conductive sheet in the comparison embodiment 2 is higher than that of the embodiments 1-5, but all of those are at a relatively high level (i.e. higher than 80%). When the wireless charging power is increased to 27 W, the charging efficiencies of the nanocrystalline magnetic conductive sheets in the comparison embodiments 1-2 decrease significantly from 82.76% to 79.20%, and from 83.20% to 78.35%, respectively, that is, decrease by 3.56% to 4.85%, meanwhile, the charging efficiencies of the nanocrystalline magnetic conductive sheets with high magnetic saturation induction in the embodiments 2-5 only decrease by 0.20% to 2.22%, and when the wireless charging power is increased to 60 W, the charging efficiencies of the nanocrystalline magnetic conductive sheets in the comparison embodiments 1-2 decrease more significantly (i.e. decrease to 76.87% and 75.60%, respectively), that is, further decrease by 2.33% to 2.75%, meanwhile, the charging efficiencies of the nanocrystalline magnetic conductive sheets with high magnetic saturation induction in the embodiments 2-5 only decrease by 0.20% to 1.59%, which indicates that, with the increase of the wireless charging power, an advantage of higher saturation current of the nanocrystalline magnetic conductive sheets with high magnetic saturation induction is reflected, compared with a common nanocrystalline magnetic conductive sheet, the wireless charging efficiency is higher. It can be seen from a comparison between the embodiment 2 and the comparison embodiment 1, when the nanocrystalline magnetic conductive sheets have same composition and saturation magnetic induction, under a condition of applying the unique annealing process provided in the present disclosure, the magnetic loss of the nanocrystalline magnetic conductive sheet under the high power condition is smaller, and the wireless charging efficiency is higher.

TABLE 3

| Ser. No. | Wireless charging power (W) | Wireless charging efficiency (%) |
|---|---|---|
| Embodiment 1 | 15 | 83.12 |
|  | 27 | 79.05 |
|  | 60 | 76.34 |
| Embodiment 2 | 15 | 82.73 |
|  | 27 | 80.51 |
|  | 60 | 78.92 |
| Embodiment 3 | 15 | 81.22 |
|  | 27 | 80.78 |
|  | 60 | 79.55 |
| Embodiment 4 | 15 | 81.08 |
|  | 27 | 80.96 |
|  | 60 | 80.12 |
| Embodiment 5 | 15 | 80.78 |
|  | 27 | 80.52 |
|  | 60 | 80.32 |
| Comparison embodiment 1 | 15 | 82.76 |
|  | 27 | 79.20 |
|  | 60 | 76.87 |
| Comparison embodiment 2 | 15 | 83.20 |
|  | 27 | 78.35 |
|  | 60 | 75.60 |

Technical features in the above embodiments can be combined arbitrarily. For concise description, not all possible combinations of the technical features in the above embodiments are described. However, any combination of the technical features described in the above embodiments should fall within the scope of the present disclosure, as long as no conflict occurs between the combined technical features.

The above embodiments, which are described in detail, are merely some implementations of the present disclosure, but they should not be construed to limit the scope of the present disclosure. It should be pointed out that, various modifications and improvements can be made by those skilled in the art without departing from the concept of the present disclosure. These modifications and improvements shall be encompassed by the protection scope of the present disclosure as defined by the appended claims.

What is claimed is:

1. A preparation method of a nanocrystalline magnetic conductive sheet for wireless charging, comprising following steps:

(1) preparing an alloy with a composition of $Fe_{(100-y-z-\alpha-\beta)}Cu_y Nb_z Si_\alpha B_\beta$ (at. %) into an alloy strip with an initial state of amorphousness by a single roll rapid quenching method, wherein $0.7 \leq y \leq 1$, $1.3 \leq z \leq 2$, $4 \leq \alpha \leq 14$, $7 \leq \beta \leq 10$, $y+z+\alpha+\beta \leq 23$;

(2) annealing an amorphous alloy strip according to a preset annealing process in step (1), to obtain a single-layer nanocrystalline strip, wherein saturation magnetic induction $B_s$ of the single-layer nanocrystalline strip is greater than 1.24T; and (3) superimposing or not superimposing multiple single-layer nanocrystalline strips obtained in step (2), performing a magnetic fragmentation process on the single-layer nanocrystalline strip or a multi-layer nanocrystalline strip, and compositing or not compositing multiple single-layer nanocrystalline strips or multiple multi-layer nanocrystalline strips that are completed the magnetic fragmentation process by a compositing process, to obtain the nanocrystalline magnetic conductive sheet for wireless charging;

wherein the preset annealing process is a twice annealing process in step (2), the twice annealing process comprises:

raising temperature to T1 at a rate of 1 to 5° C. per minute, maintaining the temperature at T1 for 10 to 60 min, raising the temperature to T2 at a rate of 0.5 to 3° C. per minute, maintaining the temperature at T2 for 30 to 240 min, reducing the temperature to below 200° C., raising the temperature to T3 at the rate of 1 to 5° C. per minute, maintaining the temperature at T3 for 10 to 60 min, raising the temperature to T4 at the rate of 0.5 to 3° C. per minute, maintaining the temperature at T4 for 20 to 240 min, reducing the temperature to below 200° C., and taking materials out of a furnace, T1 and T3 are 0 to 50° C. below a crystallization onset temperature of the alloy strip, T2 and T4 are above a crystallization peak temperature of the alloy strip, T3 is 5 to 50° C. higher than T1, and T4 is 0 to 50° C. higher than T2.

2. The preparation method of a nanocrystalline magnetic conductive sheet for wireless charging according to claim 1, wherein a width range of the amorphous alloy strip in step (1) is 10 to 215 mm, a thickness range of the amorphous alloy strip is 10 to 30 μm.

3. The preparation method of a nanocrystalline magnetic conductive sheet for wireless charging according to claim 1, wherein before the magnetic fragmentation process is performed, an outermost layer of the single-layer nanocrystalline strip or the multi-layer nanocrystalline strip in step (3) is protected by a double-sided adhesive coating process, one side of the outermost layer is coated with double-sided adhesive, and the other side of the outermost layer is coated with the double-sided adhesive or single-sided adhesive.

4. The preparation method of a nanocrystalline magnetic conductive sheet for wireless charging according to claim 3, wherein a number of layers of multi-layer superimposing in step (3) is 2 to 4, and adjacent two layers of nanocrystalline strips are fixed by the double-sided adhesive.

5. The preparation method of a nanocrystalline magnetic conductive sheet for wireless charging according to claim 4, wherein a thickness range of the double-sided adhesive or the single-sided adhesive is 1 to 5 μm.

6. The preparation method of a nanocrystalline magnetic conductive sheet for wireless charging according to claim 1, wherein the magnetic fragmentation process in step (3) comprises transverse or longitudinal roller shearing, or rolling compaction by a roller or a flat board with convex members, or other method that makes crack lines appear on a surface of the nanocrystalline strip.

* * * * *